(12) United States Patent
Bienkowski et al.

(10) Patent No.: US 9,880,925 B1
(45) Date of Patent: Jan. 30, 2018

(54) COLLECTING STRUCTURED PROGRAM CODE OUTPUT

(71) Applicant: The MathWorks, Inc., Natick, MA (US)

(72) Inventors: Joseph R. Bienkowski, Ashland, MA (US); Bryan T. White, Holliston, MA (US); Christian R. Weigandt, Boston, MA (US); Koh M. Shimizu, Natick, MA (US); Jason D. Breslau, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/867,840

(22) Filed: Sep. 28, 2015

(51) Int. Cl.
    *G06F 9/44*    (2006.01)
    *G06F 11/36*   (2006.01)
    *G06F 9/54*    (2006.01)

(52) U.S. Cl.
    CPC ............ *G06F 11/3688* (2013.01); *G06F 8/70* (2013.01); *G06F 9/542* (2013.01)

(58) Field of Classification Search
    CPC .............. G06F 11/3636; G06F 11/362; G06F 11/3644; G06F 11/3612; G06F 11/3668; G06F 11/3604; G06F 11/3692; G06F 19/26
    See application file for complete search history.

(56) References Cited

U.S. PATENT DOCUMENTS

| | | | | |
|---|---|---|---|---|
| 6,161,216 A * | 12/2000 | Shagam | ............... | G06F 11/3624 717/128 |
| 7,028,291 B2 * | 4/2006 | Sumida | ............... | G06F 11/3624 717/128 |
| 7,890,837 B2 * | 2/2011 | Boskovic | ................ | G06F 11/26 714/703 |
| 8,104,021 B2 * | 1/2012 | Erlingsson | .......... | G06F 12/1441 717/126 |
| 8,108,839 B2 * | 1/2012 | Clark | ................... | G06F 11/3636 717/128 |

(Continued)

OTHER PUBLICATIONS

Bart Vermeulen; Functional Debug Techniques for Embedded Systems; 2008 IEEE; pp. 208-215; <http://ieeexplor.ieee.org/stamp/stamp.jsp?arnumber=4534159>.*

Yin Wei-feng et al.; Realization of Distributed Remote Laboratory and Remote Debug Software for Embedded System; 2008 IEEE; pp. 1433-1442; <https://pdfs.semanticscholar.org/6fb4/6379f7d7c636b9b2d8b81a6350d2b8c822c3.pdf>.*

Ehab Anis et al.; On Using Lossless Compression of Debug Data in Embedded Logic Analysis; 2007 IEEE; 10 pages; <http://ieeexplore.ieee.org/stamp/stamp.jsp?arnumber=4437613>.*

Taghi M. Khoshgoftaar et al.; Detection of Software Modules with High Debug Code Churn in a Very Large Legacy System; 1996 IEEE; pp. 364-371; <http://ieeexplore.ieee.org/stamp/stamp.jsp?arnumber=558896>.*

(Continued)

*Primary Examiner* — Thuy Dao
*Assistant Examiner* — Cuong V Luu
(74) *Attorney, Agent, or Firm* — Harrity & Harrity, LLP

(57) ABSTRACT

A system may obtain an executable code segment of program code. The executable code segment may be associated with an emitter, and the program code, when executed, may be associated with a plurality of execution states. Each execution state, of the plurality of execution states, may correspond to a state of execution at a point in the execution of the program code that causes an event, of the plurality of events. The system may execute the executable code segment. The system may receive, from the emitter and based on executing the executable code segment, a program state corresponding to the particular execution state. The emitter may emit the information based on a particular event caused by executing the executable code segment. The system may collect the program state and information describing the particular event.

20 Claims, 10 Drawing Sheets

(56) References Cited

U.S. PATENT DOCUMENTS

| | | | | |
|---|---|---|---|---|
| 8,122,437 | B2* | 2/2012 | Xu | G06F 11/3636 |
| | | | | 717/128 |
| 8,359,584 | B2* | 1/2013 | Rao | G06F 11/3624 |
| | | | | 717/128 |
| 8,561,033 | B2* | 10/2013 | Aranguren | G06F 11/3636 |
| | | | | 717/128 |
| 9,519,571 | B2* | 12/2016 | Li | G06F 11/3676 |
| 2003/0028860 | A1* | 2/2003 | Sumida | G06F 11/3628 |
| | | | | 717/125 |
| 2008/0134148 | A1* | 6/2008 | Clark | G06F 11/3636 |
| | | | | 717/128 |
| 2008/0155367 | A1* | 6/2008 | Boskovic | G06F 11/26 |
| | | | | 714/736 |
| 2009/0019428 | A1* | 1/2009 | Li | G06F 11/3676 |
| | | | | 717/128 |
| 2011/0154300 | A1* | 6/2011 | Rao | G06F 11/3624 |
| | | | | 717/133 |

OTHER PUBLICATIONS

Shan Tang et al.; A Multi-Core Debug Platform for NoC-Based Systems; 2007 EDAA; 6 pages; <http://ieeexplore.ieee.org/stamp/stamp.jsp?arnumber=4211912>.*

Emilio Serrano et al; Intelligent data analysis applied to debug complex software systems; 2009 Elsevier; pp. 2785-2795; <http://www.sciencedirect.com/science/article/pii/S0925231209001180>.*

* cited by examiner

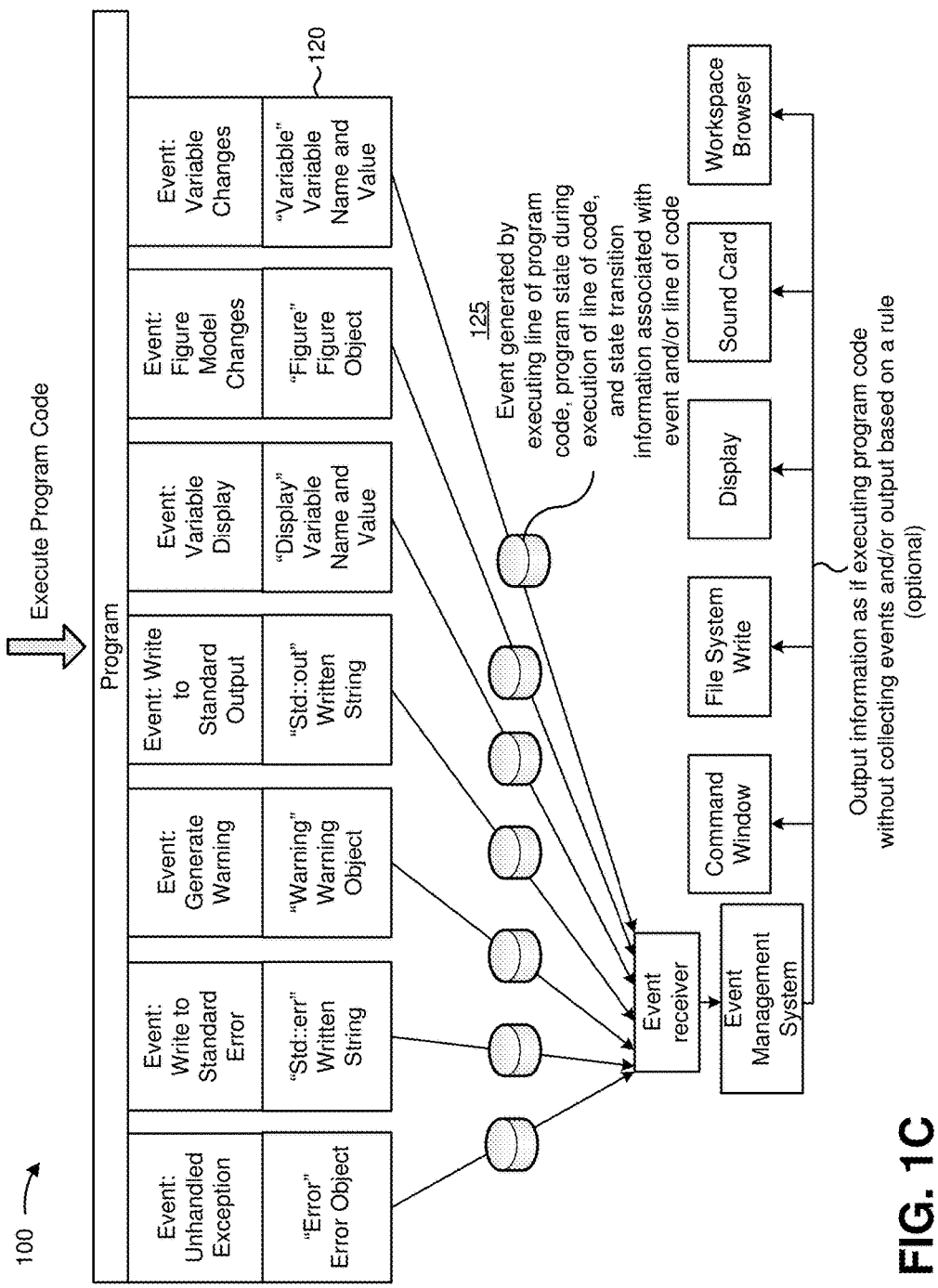

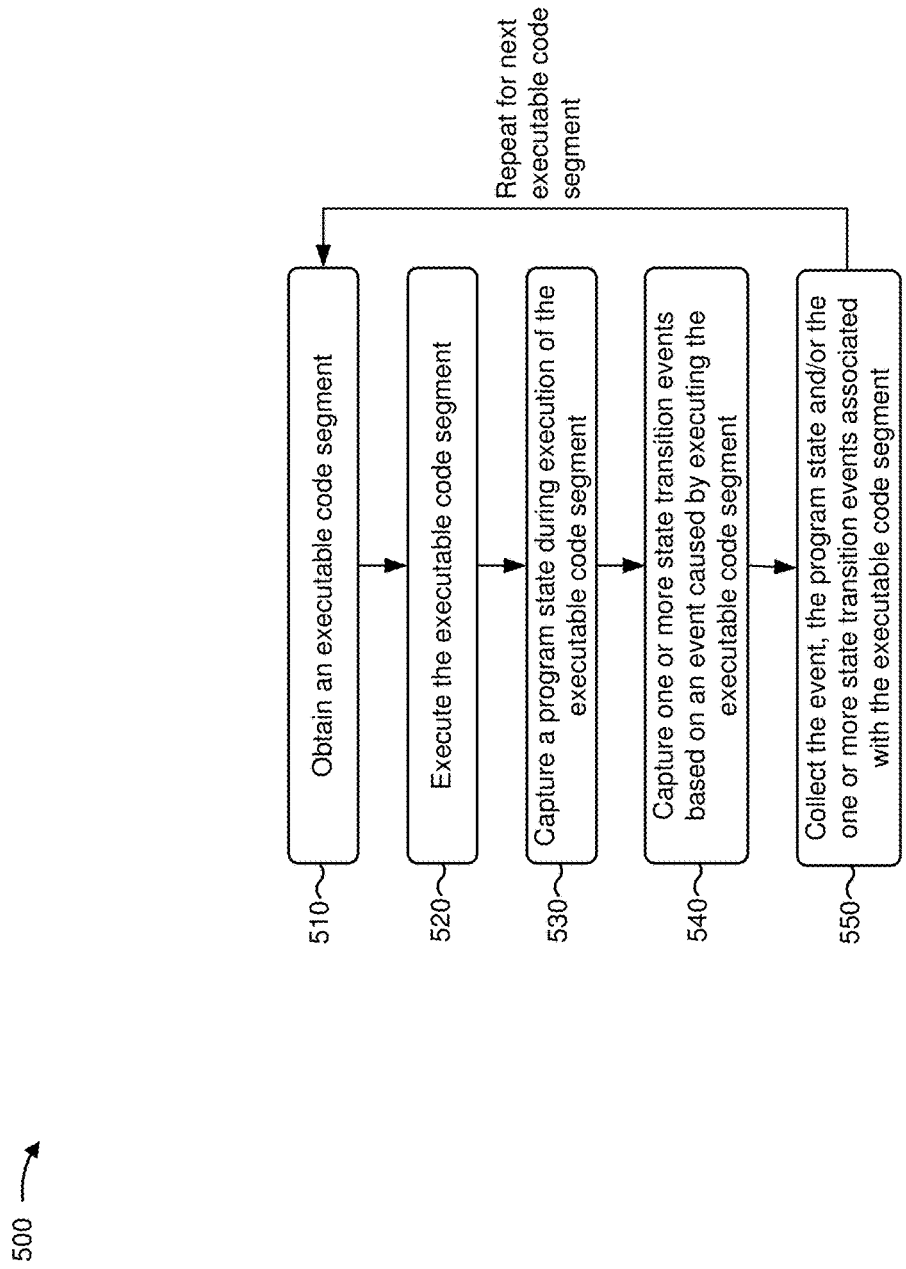

COLLECTING STRUCTURED PROGRAM CODE OUTPUT

BRIEF DESCRIPTION OF THE DRAWINGS

FIGS. 1A-1C are diagrams of an overview of an example implementation described herein;

FIG. 5 is a flow chart of an example process for collecting and providing events, states, and/or state transition information for program code.

DETAILED DESCRIPTION

Figure 1A:
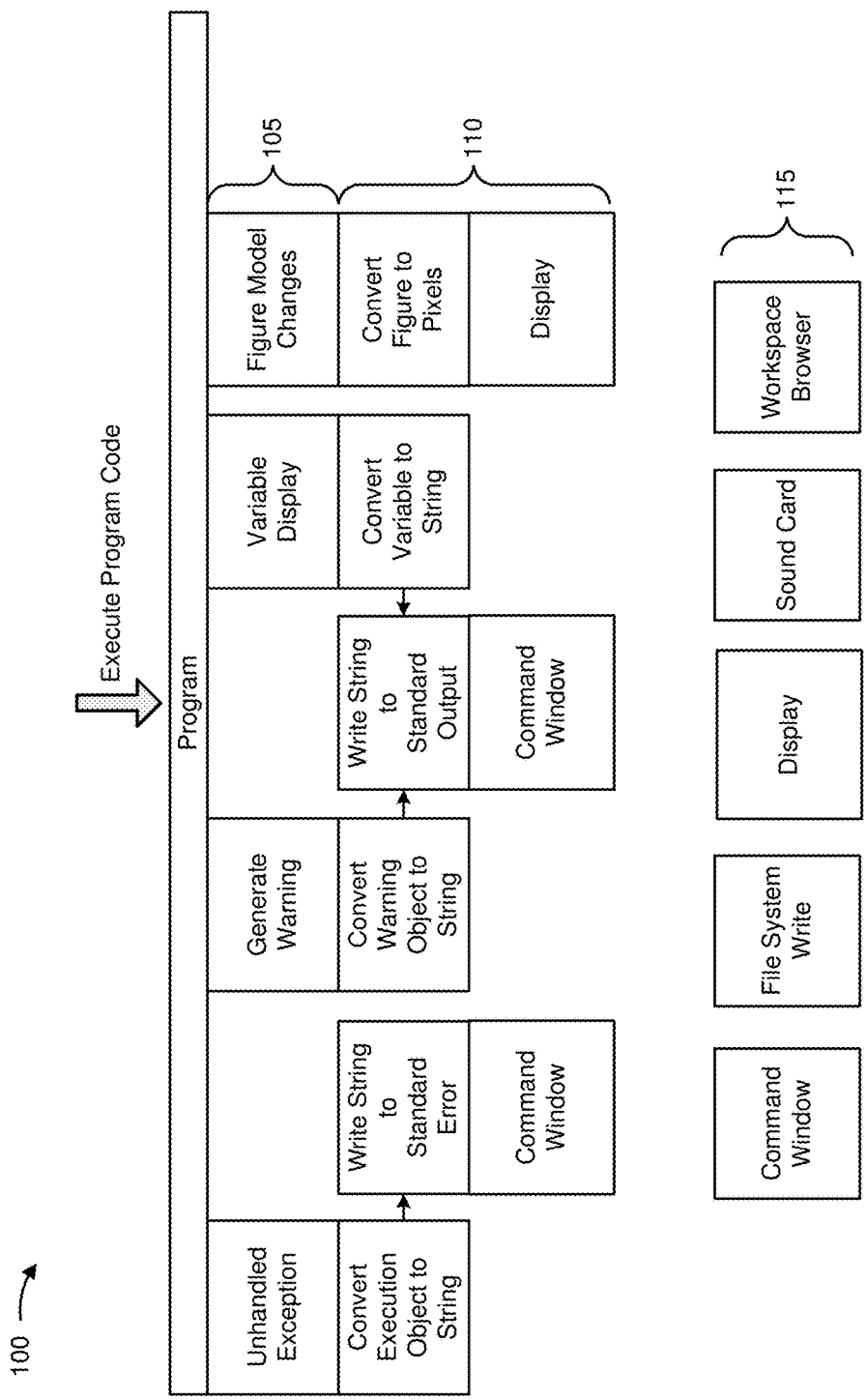

The following detailed description of example implementations refers to the accompanying drawings. The same reference numbers in different drawings may identify the same or similar elements.

A computer programmer may want to determine information based on executing program code. The information may identify and/or describe inputs received based on executing the program code, outputs provided based on executing the program code, variables created, modified, and/or deleted based on executing the program code, files created, modified, called, and/or deleted based on executing the program code, technical information (e.g., processor usage, memory usage, etc.), or the like. The computer programmer may use, for example, a debugging tool to determine the information (e.g., by specifying lines of program code, variables, functions, or the like, that the debugging tool may cause to be executed and/or monitored).

Further, the computer programmer may want to interact with information determined based on executing a particular portion of the program code. For example, the computer programmer may want to re-execute the program code at a particular point, may want to identify variable values at the particular point, may want to measure processor usage at the particular point, may want to identify memory usage at the particular point, or the like. However, traditional debugging tools, which may receive and record outputs of the program code, may not generate debugging information that is sufficiently detailed to permit the computer programmer to interact with the information based on executing the particular portion of the program code. Further, traditional debugging tools may not capture information sufficient to describe a complete program state at the particular portion of the program code.

Implementations described herein may enable a client device to interact with information determined based on executing particular portions of the program code. By collecting information identifying complete program states that correspond to particular points in execution of the program code, the client device may enable the computer programmer to reconstruct the execution at a particular point, to analyze the program states, to re-execute the program code from a particular program state, or the like. Further, the client device may perform operations based on values in a particular program state, despite the values in the particular program state being different than in subsequent program states. For example, the device may perform operations based on a particular variable value at a point in the program code, despite the particular variable value being changed in a subsequent operation of the program code. Thus, implementations described herein may conserve processor resources, may decrease the time needed to debug computer programs by improving efficiency of the debugging process, and may improve efficiency of analyzing the program code by permitting analysis of the program states.

Figure 1B:
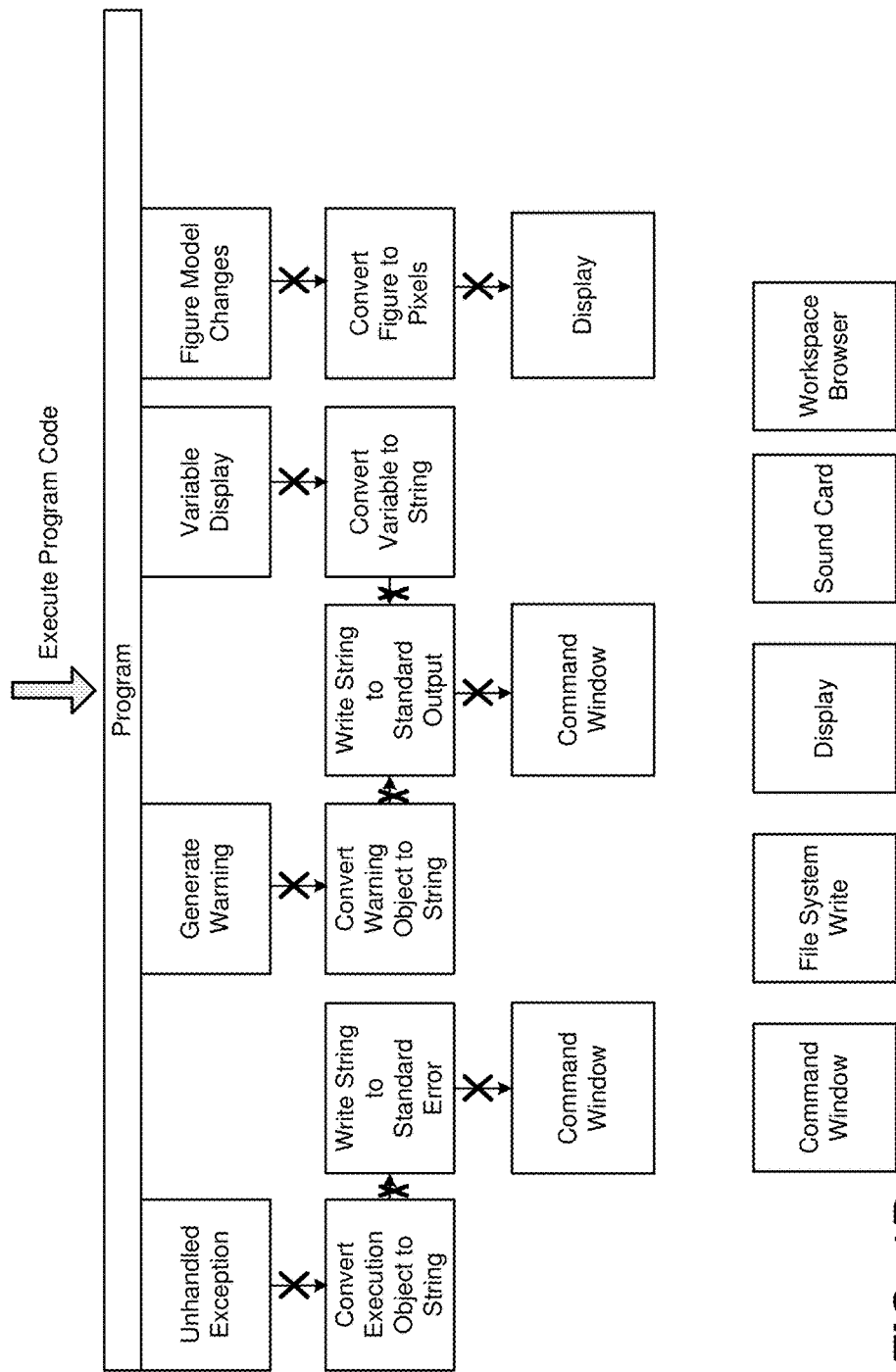

FIGS. 1A-1C are diagrams of an overview of an example implementation 100 described herein. For the purpose of FIGS. 1A-1C, assume that program code is executed by a client device.

FIG. 1A is an overview of events caused when executing program code without collecting structured output information. As shown in FIG. 1A, a client device may execute program code. As shown by reference number 105, when executed, the program code may cause events that are associated with objects. As shown, the events may include identifying an unhandled exception, generating a warning, displaying a variable, changing a model of a displayed figure, or the like. As shown by reference number 110, the client device may perform actions based on the events caused by executing the program code. For example, when execution of the program code causes an unhandled exception, the client device may generate an execution object that describes the unhandled exception, may convert the execution object to a string of characters, may write the string of characters to a standard error file, and/or may output the standard error file to a command window. As another example, when execution of the program code causes a warning to be generated, the client device may generate a warning object that describes the warning, may convert the warning object to a string of characters, may write the string of characters to a standard output file, and/or may output the string of characters to a command window.

As another example, when execution of the program code causes a variable to be displayed, the client device may convert the variable to a string of characters, may write the string of characters to a standard output file, and/or may output the string of characters to a command window. As yet another example, when execution of the program code causes a displayed figure to be changed, the client device may render the figure as changed by converting the figure to pixels and providing the pixels for display.

As shown by reference number 115, when executed, the program code may cause outputs to a variety of components. For example, the program code may cause an output to a command window, may cause information to be written to a file system, may cause information to be displayed on a display of the client device, may cause information to be provided to a sound card, may cause information to be provided to a workspace browser, or the like.

FIG. 1B is an overview of events caused when executing the program code for collection of structured output information. As shown in FIG. 1B, when executing the program code for collection of structured output information, the client device may not perform the actions described in FIG. 1A. For example, the client device may not convert objects to strings (e.g., execution objects, warning objects, variable objects, etc.), may not render a figure, may not output to a command window, a file system, a display, a sound card, a workspace browser, or the like. In FIG. 1B, arrow-tipped lines having "X" thereon indicate typical operations that are not performed when the executing program is configured to collect structured output information. That is, based on the client device collecting the structured output information, the client device may not provide outputs that the client device may typically provide when executing the program code. Additionally, or alternatively, the client device may provide the outputs that the client device typically provides in addition to collecting structured output information.

FIG. 1C shows an overview of collecting structured output information based on executing the program code. As shown, executing the program code may cause a variety of events (e.g., an unhandled exception, an output to write to a standard error file, a generated warning, an output to write to a standard output file, a variable display, a modification to a figure, a change to a variable value, etc.). Each of the events may be associated with a program state. A program state may describe the execution of the program code at a point in the program code associated with an event. For example, the program state may identify variable values, memory usage, processor usage, an input value, an output value, one or more functions (e.g., subroutines, etc.) that are executing at the point in the program code, or the like. Also, program state can change as program code executes. As the program code executes, the events may maintain an accurate representation of the program state at the point that the events were collected (e.g., by reconstruction of the program state, by copying the program state, by serializing/deserializing the program state, etc.).

As shown by reference number 120, the events may be associated with objects. An object may include information related to the event. Here, the "unhandled exception" event is associated with an error object, the "write to standard error" event is associated with an object including a written string, the "generate warning" event is associated with a warning object, the "write to standard output" event is associated with an object including a written string, the "variable display" event is associated with an object identifying a variable name and a variable value to be displayed, a modification to a figure is associated with a "figure object," and a variable change event is associated with a variable change object that identifies a variable name and a variable value. In some implementations, the objects may be generated and/or emitted by emitters associated with the events, as described in more detail in connection with FIG. 5, below. An emitter may include a portion of program code that provides information describing an event, including a program state, to an event management system. The information may include a reference to a variable value at a point in execution of the program code associated with the event, and/or may include a copy of the variable in the program code.

An event may be associated with a state transition from a first program state to a second program state. For example, the event may change a variable value, may modify a figure, may cause a second event to be performed, may cause an iteration of a loop to be executed, or the like. The client device (e.g., an event collector on the client device) may collect state transition information describing the state transitions.

As shown by reference number 125, the client device may collect structured output information associated with the events. Here, an event collector collects structured output information describing the events, program states associated with the events, and state transition information associated with each event. As shown, the event collector may provide the structured output information to an event management system. The event management system may perform operations in relation to the structured output information. For example, the event management system may cause the client device to store the structured output information, to provide the structured output information to a user and/or another device, or the like. In some implementations, the event management system may cause the client device to output information as if executing the program code without collecting the events. For example, the client device may display outputs and/or figures, may store information, or the like, as described in connection with FIG. 1A, above.

As shown, in some cases, the client device may output information based on a configuration of the client device. The program code, or an event management system that collects the structured output information, may include instructions for processing and/or providing part or all of the structured output information based on a configuration. For example, the configuration may cause the client device to eliminate redundant or cumulative output, to output less structured output information for a loop in the program code, to provide certain information to another device, to output a file including the structured output information, or the like.

Figure 2:
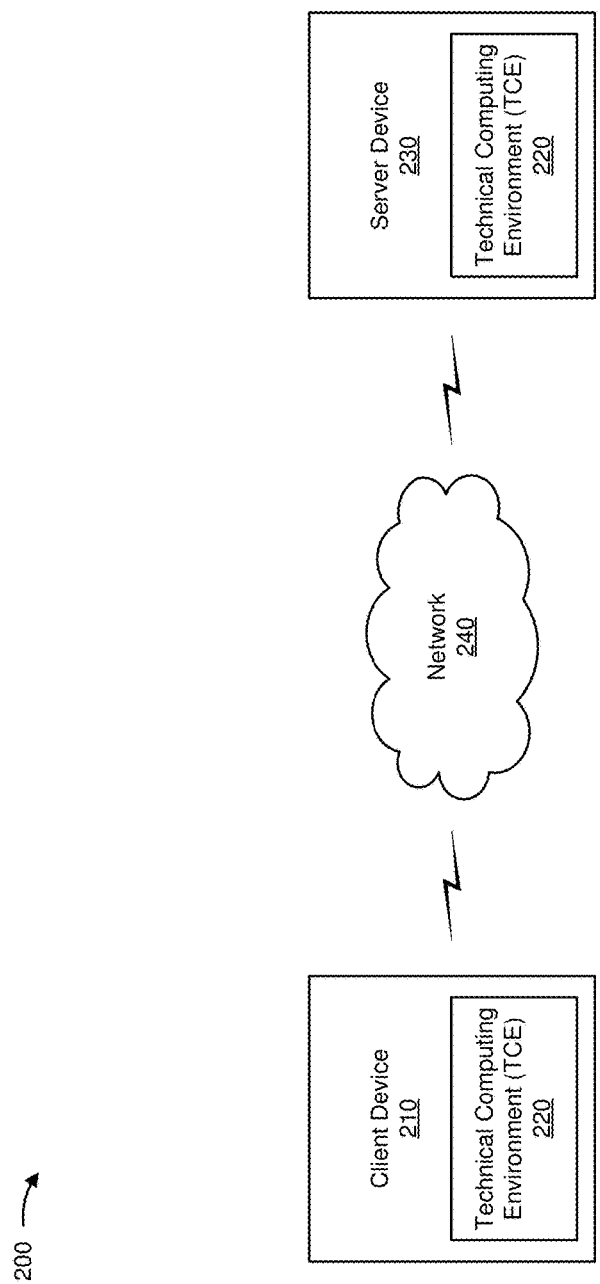
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, executing, and/or providing program code and/or information associated with program code (e.g., structured output information, a result of evaluating program code, etc.). For example, client device 210 may include a computing device, such as a desktop computer, a laptop computer, a tablet computer, a mobile phone (e.g., a smart phone, a radiotelephone, etc.), or a similar device. Client device 210 may evaluate program code by, for example, executing the program code, determining an error associated with the program code (e.g., by validating the program code, debugging the program code, etc.), or the like. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a code evaluation portion that provides results corresponding to program code displayed in the code editor portion. In some implementations, TCE 220 may include a command line interface.

Server device 230 may include one or more devices capable of receiving, generating, storing, processing, and/or providing program code and/or information associated with program code. For example, server device 230 may include a computing device, such as a server, a desktop computer, a laptop computer, a tablet computer, or a similar device. In some implementations, server device 230 may include an embedded device, such as a microcontroller (e.g., an Arduino microcontroller, a device utilizing an ARM architecture, a device utilizing an x86 architecture, etc.). In some implementations, server device 230 may host TCE 220. In some implementations, client device 210 may be used to access one or more TCEs 220 running on one or more server devices 230. For example, multiple server devices 230 may be used to evaluate program code (e.g., serially or in parallel) and may provide respective results of evaluating the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
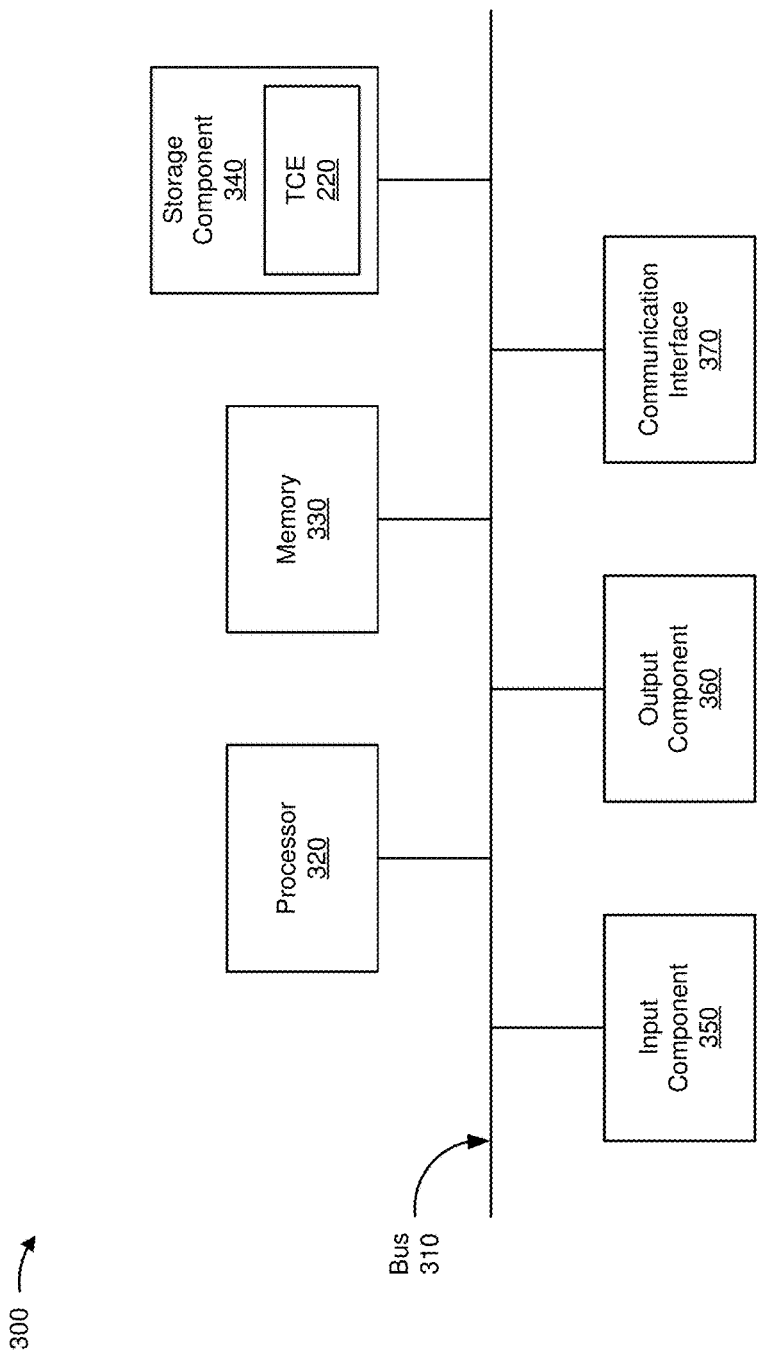
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4D are diagrams of an example implementation 400 of collecting and providing events, states, and/or state transition information for program code. For the purpose of FIGS. 4A-4D, a set of program code is described. A set of program code includes a collection or one or more sections of programming code. Sections of programming code can include a portion of a line of code, an entire line of code, a plurality of lines of code arranged in a block, sub routine, function, script, sub-program, etc. In FIGS. 4A-4D, the set of program code includes six lines of code.

Figure 4A:
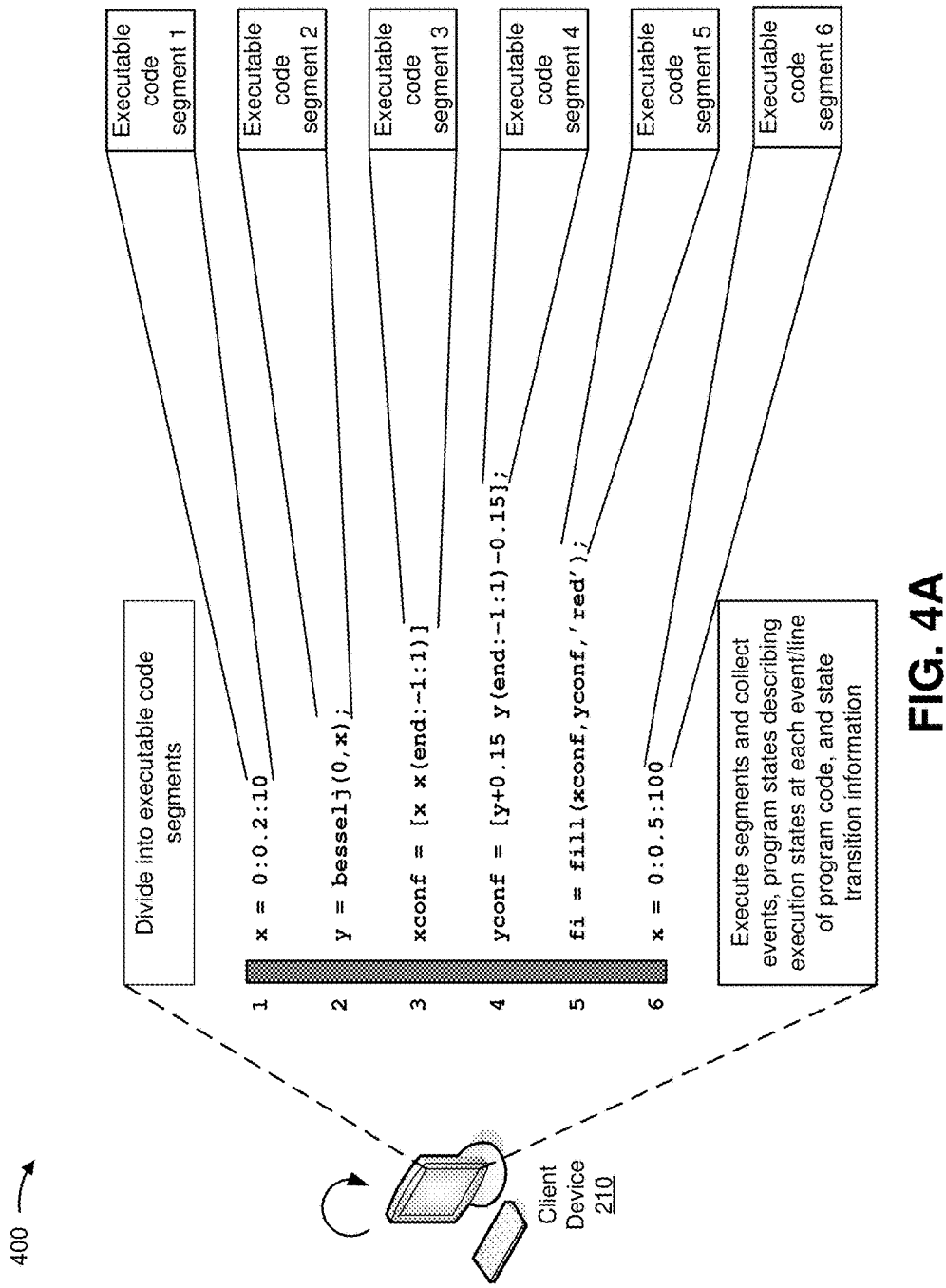
FIGS. 4A-4D are diagrams of an example implementation of collecting and providing events, states, and/or state transition information for program code.

As shown in FIG. 4A, client device 210 may obtain the set of program code, as described in more detail in connection with block 510 of FIG. 5, below. As shown, the set of program code may include the following lines of program code:

1 x=0:0.2:10
2 y=besselj(0,x);
3 xconf=[x x(end:−1:1)];
4 yconf=[y+0.15 y(end:−1:1) −0.15];
5 fi=fill(xconf,yconf,'red');
6 x=0:0.5:100

The set of program code may include different executable levels of program code. For example, the entire set of program code may be at a first executable level. Lines of the set of program code may be at a second, lower executable level (e.g., line one, line two, etc., and the second executable level may be lower than the first executable level). Functions included in the lines may be at a third, still lower executable level (e.g., the besselj function, the fill function, etc.). Subroutines of the functions may be at a fourth, lowest, executable level. Structured output information may be emitted based on any of the different executable levels. For example, structured output information may be emitted at the program level, the line level, the function level, the subroutine level, the character/column level, and so on. Other implementations of the executable levels are possible, and are described in more detail elsewhere herein.

Here, the set of program code is described in six executable code segments: executable code segment 1, corresponding to line one of the set of program code, executable code segment 2, corresponding to line two of the set of program code, executable code segment 3, corresponding to line three of the set of program code, executable code segment 4, corresponding to line four of the set of program code, executable code segment 5, corresponding to line five of the set of program code, and executable code segment 6, corresponding to line six of the set of program code.

As shown, client device 210 may execute the six executable code segments, as described in more detail in connection with block 520 of FIG. 5, below. Assume that client device 210 inserts emitters in the six executable code segments. Assume further that, when the program code is executed, the emitters emit structured output information identifying events, program states, and state transition information, as described in more detail in connection with blocks 530 and 540 of FIG. 5, below. As shown, client device 210 may collect the structured output information that identifies the events, the program states, and the state transition information, as described in more detail in connection with block 550 of FIG. 5, below.

Figure 4B:
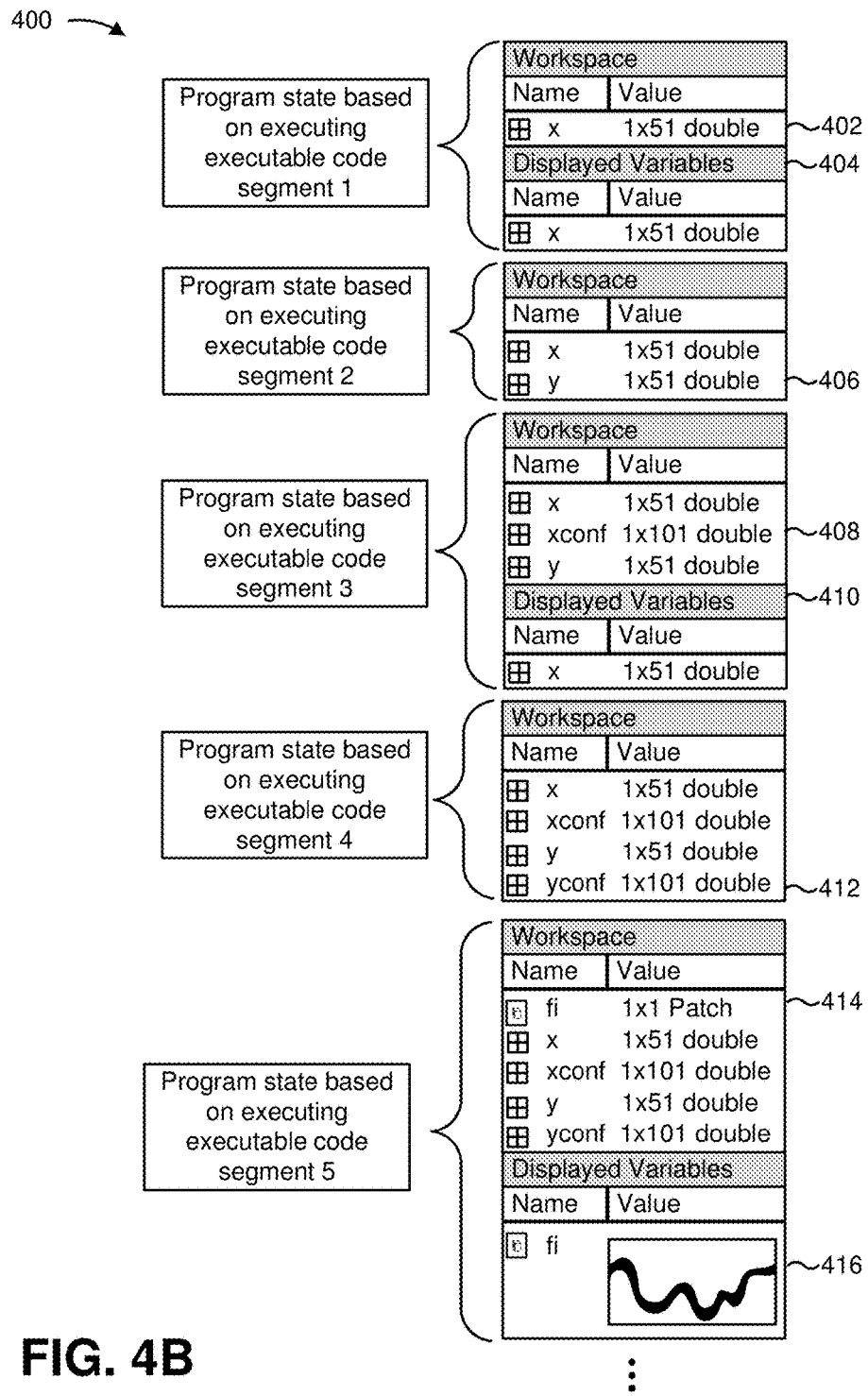
Figure 4C:
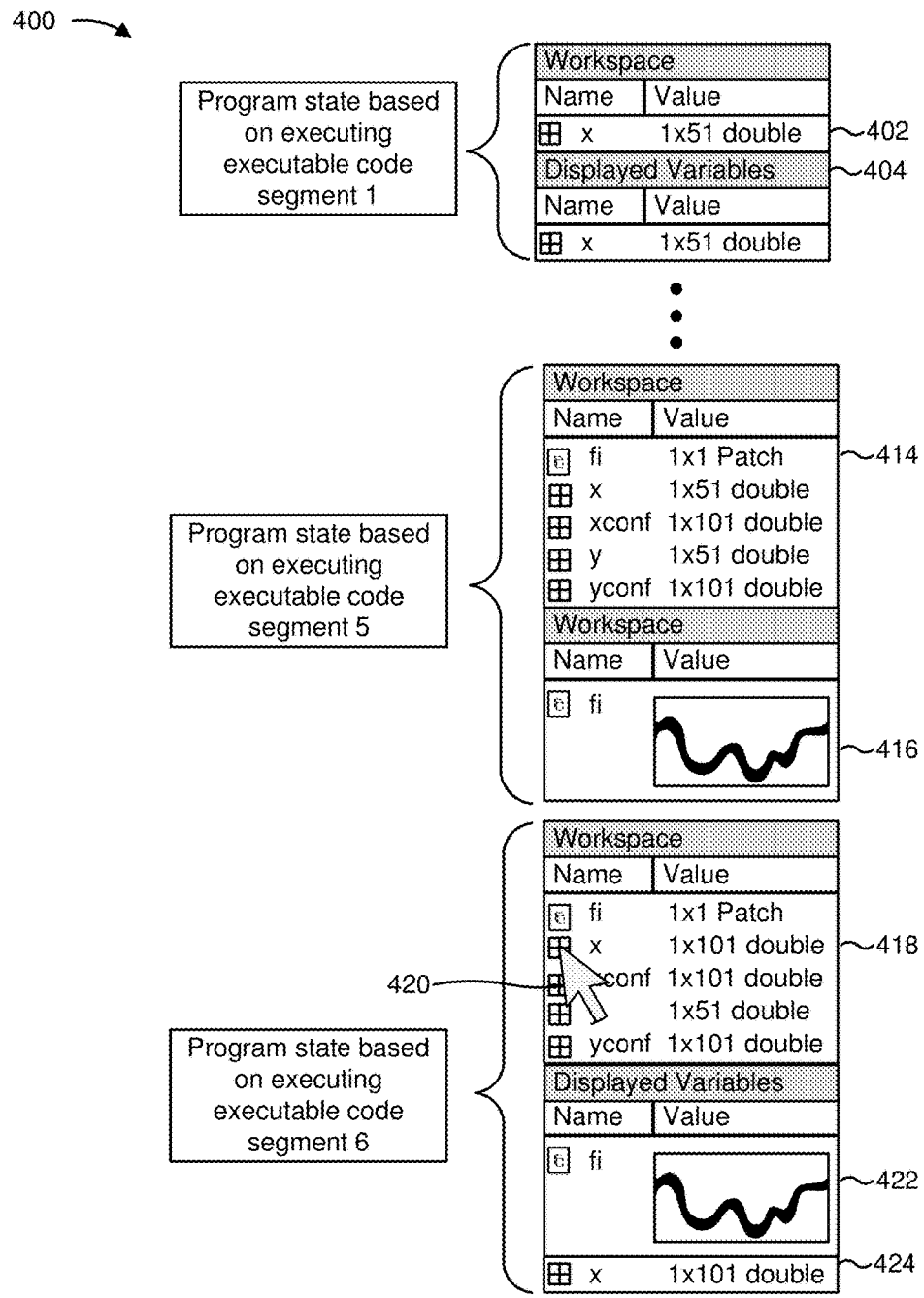
Figure 4D:
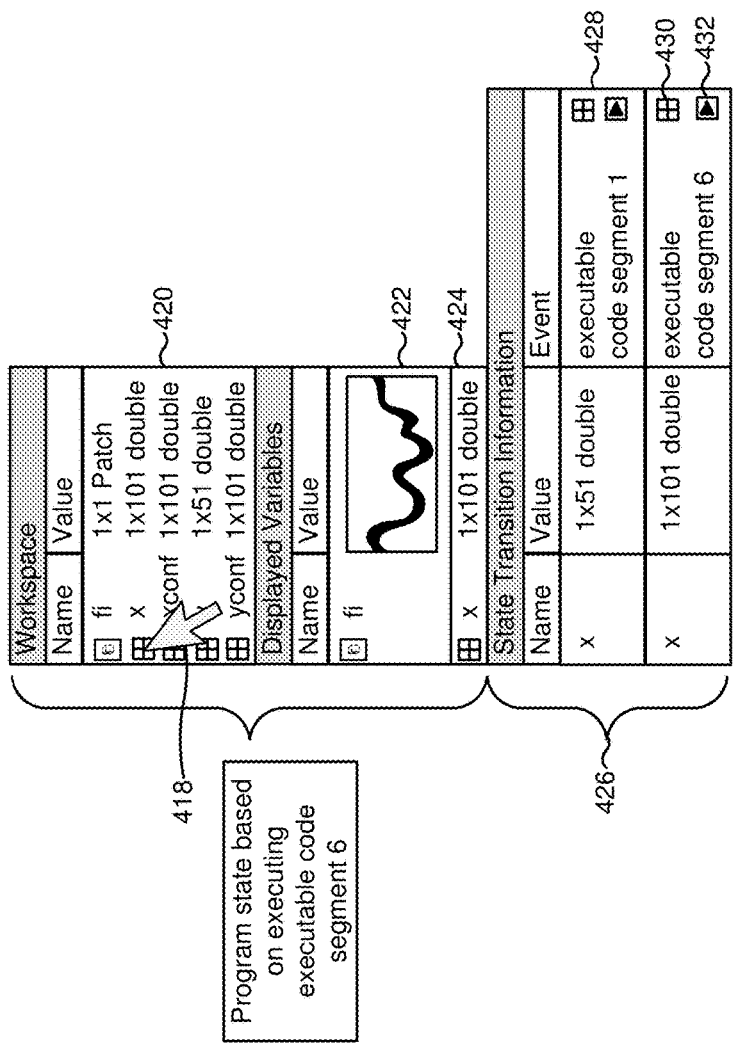

In FIGS. 4B-4D, client device 210 provides, for display (e.g., via TCE 220 of client device 210), structured output information that is collected based on executing each of the six executable code segments. As shown in FIG. 4B, client device 210 may provide information describing the structured output information. As shown by reference number 402, client device 210 may provide information identifying a variable and a value associated with the variable. Here, client device 210 identifies a variable "x," and identifies the variable "x" as a double precision data type array with a size of 1×51 (e.g., a variable associated with numbers in a double precision floating-point format, that includes one row of 51 values). Client device 210 may identify "x" based on executable code segment 1 causing a value to be assigned to "x."

As shown by reference number 404, client device 210 may provide information identifying displayed variables. Here, client device 210 provides information identifying the variable "x" as a displayed variable, since an output of executable code segment 1 is not suppressed (e.g., by including a semicolon after executable code segment 1, as shown in FIG. 4A). A displayed variable may include a variable for which client device 210 provides, for display, an output, when client device 210 executes executable code segment 1.

As shown by reference number 406, client device 210 may provide information describing a program state based on executing executable code segment 2. Here, client device 210 identifies a variable "y," and identifies the variable "y" as a double precision data type array with a size of 1×51. As further shown, client device 210 identifies "x," based on "x" still being associated with a value as assigned by executable code segment 1.

As shown by reference number 408, client device 210 may provide information describing a program state based on executing executable code segment 3. As shown, based on executable code segment 3 assigning a value to a variable "xconf," client device 210 may provide information related to the variable "xconf." Here, client device 210 identifies "xconf," and identifies the variable "xconf" as a double precision data type array with a size of 1×101 (e.g., one row of 101 values). As shown by reference number 410, client device 210 may provide information describing displayed variables. Here, the information describing displayed variables does not identify "y" or "xconf" because "y" and "xconf" are not provided for display when client device 210 executes executable code segments 2 and 3 (e.g., based on semicolons being included after executable code segments 2 and 3 to suppress executable code segments 2 and 3).

As shown by reference number 412, client device 210 may provide information describing a program state based on executing executable code segment 4. As shown, based on executable code segment 4 assigning a value to a variable "yconf," client device 210 may provide information related to "yconf." Here, client device 210 identifies "yconf," and identifies the variable "yconf" as a double precision data type array with a size of 1×101.

As shown, client device 210 may provide information describing a program state based on executing executable code segment 5. Executable code segment 5 includes a function to generate and display a filled polygon (e.g., "fi=fill(xconf,yconf,'red'"). As shown by reference number 414, based on executable code segment 5 generating a filled polygon, client device 210 may define a variable of "fi" to store information identifying the filled polygon. As further shown by reference number 414, the variable of "fi" is associated with a patch object and a size of 1×1 (e.g., one value). As shown by reference number 416, client device 210 may provide a graphical representation of the filled polygon as a value of the variable of "fi."

As shown in FIG. 4C, client device 210 may provide information describing a program state based on executing executable code segment 6. Executable code segment 6 may assign a second value to "x" (e.g., a second value associated with a size of 1×101, rather than a first value associated with a size of 1×51, as shown in FIG. 4B). As shown by reference number 418, client device 210 identifies the second value of "x" based on executing executable code segment 6.

As shown by reference number 420, a user may interact with a displayed element that is associated with "x." When client device 210 receives an interaction with the displayed element, client device 210 may provide additional information related to the variable of "x." For example, client device 210 may identify past values of "x" (e.g., as assigned by executable code segment 1), may identify an event that assigned the second value to "x," may identify a memory address associated with "x," may identify other executable code segments that call "x," or the like. In this way, client device 210 may provide additional information about a variable based on collecting structured output information, which may facilitate debugging and/or performance improvement of the set of program code.

As shown by reference number 422, client device 210 may provide information identifying displayed objects. Here, client device 210 identifies the variable of "fi" and provides values of "fi." As shown by reference number 424, client device 210 identifies the variable of "x" and provides the new value of "x" (e.g., "1×101 double").

As shown in FIG. 4D, and by reference number 426, client device 210 may provide state transition information for the variable of "x." Assume that client device 210 provides the state transition information based on the interaction with the graphical element shown by reference number 418. As shown by reference number 428, client device 210 may provide information identifying a first value of "x" (e.g., a value of a double precision data type array with a size of 1×51), and an executable code segment that caused the first value of "x" to be assigned (e.g., executable code segment 1). As shown by reference number 430, client device 210 may provide information identifying a second value of "x" and an executable code segment that assigned the second value of "x" (e.g., a value of a double precision data type array with a size of 1×101, as assigned by executable code segment 6).

As shown, client device 210 may provide graphical elements in association with the state transition information. Here, as shown by reference number 430, client device 210 may provide a first graphical element (e.g., a button including a "+" sign) to obtain additional information in association with executable code segment 6. When client device 210 receives an interaction with the first graphical element, client device 210 may provide additional information (e.g., may identify executable code segment 6, may identify other variables modified by executable code segment 6, may identify processor usage in association with executable code segment 6, may identify memory addresses associated with variables of executable code segment 6, etc.).

As shown by reference number 432, client device 210 may provide a second graphical element (e.g., a button including an arrow). The second graphical element may cause client device 210 to re-execute executable code segment 6. When client device 210 receives an interaction with the second graphical element, client device 210 may re-execute executable code segment 6, without re-executing executable code segments 1, 2, 3, 4, or 5. For example, client device 210 may assign values of the variables as identified by the program state based on executing executable code segment 5, and may execute executable code segment 6. In this way, client device 210 may support re-execution of an executable code segment without re-executing a remainder of the set of program code, which may conserve processor resources.

As indicated above, FIGS. 4A-4D are provided merely as an example. Other examples are possible and may differ from what was described with regard to FIGS. 4A-4D. For example, client device 210 may collect additional and/or different events and/or states than the ones described with regard to FIGS. 4A-4D.

FIG. 5 is a flow chart of an example process 500 for collecting events, states, and/or state transition information for program code. In some implementations, one or more process blocks of FIG. 5 may be performed by client device 210. In some implementations, one or more process blocks of FIG. 5 may be performed by another device or a set of devices separate from or including client device 210, such as server device 230.

As shown in FIG. 5, process 500 may include obtaining an executable code segment (block 510). For example, client device 210 may obtain an executable code segment, as described in connection with FIG. 4A, above. In some implementations, a user may input information identifying the executable code segment or a memory location at which the executable code segment is stored (e.g., in memory local to or remote from client device 210). Based on the user input, client device 210 may retrieve the program code. Additionally, or alternatively, client device 210 may provide a user interface (e.g., via TCE 220) via which a user may input program code, and client device 210 may obtain the executable program code via the user interface.

An executable code segment may include, for example, a function, a line of program code, a set of lines of program code, a portion of a line of program code, or each line of code in a program. In some implementations, program code may include several executable code segments, and client device 210 may obtain one of the several executable code segments. For example, client device 210 may receive the program code, and may determine to collect structured output information for the program code based, for example, on an input from a user. In such a case, client device 210 may divide the program code into the several executable code segments.

As further shown in FIG. 5, process 500 may include executing the executable code segment (block 520). For example, client device 210 may execute the executable code segment. Client device 210 may, depending on a configuration of client device 210, execute the executable code segment locally, remotely, using a single processor, or using multiple processors in serial or in parallel. Additionally, or alternatively, client device 210 may execute the executable code segment in isolation (e.g., in a sandbox environment, on server device 230, etc.). Client device 210 may execute the executable code segment to determine events caused by the executing, program states associated with the executable code segment, and/or state transition information describing transitions between program states.

As further shown in FIG. 5, process 500 may include capturing a program state during execution of the executable code segment (block 530). For example, client device 210 may capture a program state during execution of the executable code segment. In some implementations, client device 210 may capture the program state based on executing the executable code segment. For example, the executable code segment may include an emitter that provides information identifying the program state when the executable code segment is executed.

An emitter may include a portion of program code that, when executed, causes client device 210 to provide structured output information (e.g., information describing an event, a program state associated with the event, state transition information relating to the event, etc.) to an event receiver. The event receiver may be associated with client device 210, and may store structured output information. In some implementations, the event receiver may provide the structured output information to an event management system and/or another device (e.g., server device 230).

In some implementations, the emitter may be inserted in the executable code segment by a computer programmer using an input device. Additionally, or alternatively, client device 210 may insert the emitter. For example, client device 210 may insert emitters in certain executable code segments based on user input to specify the certain executable code segments from a set of executable code segments, may insert emitters in each executable code segment of program code, may insert emitters in executable code segments that include a particular operation, a particular type of operation, or the like, may insert emitters in executable code segments that cause a particular event, may insert an emitter in an executable code segment based on the executable code segment causing an error when executed, or the like.

As an example, assume that client device 210 is configured to collect a program state when a variable value is printed for display. In such a case, client device 210 may insert an emitter in program code associated with printing variable values for display. Client device 210 may insert the emitter based on a computer programmer specifying to insert the emitter, based on client device 210 being configured to collect the program state when the variable value is printed for display, or the like. The emitter, when executed, may provide information identifying the variable value, a name of the variable, and information identifying the "print variable" event.

In some implementations, client device 210 may insert an emitter based on a condition being met. For example, client device 210 may insert an emitter when a variable changes variable types, when memory usage satisfies a threshold, when processor usage satisfies a threshold, when all processor resources are used for a threshold period of time, or the like.

The program state may include information identifying a state of program code at a point in execution of the program code associated with the executable code segment. For example, if the executable code segment includes a function that receives an input, the program state may identify the function, may identify the input, may identify a value of the input, may identify a memory address associated with the input and/or a definition of the function, may identify processor usage associated with performing the function, may identify values of other variables associated with the executable code segment, may identify other functions, subroutines, or the like that are executing concurrently with the function, or the like.

The program state may enable client device 210 to re-execute an executable code segment, of a set of program code, without re-executing prior program code in the set of program code. For example, the program state may identify variable values, active functions and/or subroutines, memory addresses, or other information related to the executable code segment, which client device 210 may use to re-execute the executable code segment.

As further shown in FIG. 5, process 500 may include capturing state transition information based on an event caused by executing the executable code segment (block 540). For example, client device 210 may capture state transition information that describes one or more state transitions. A state transition may describe a transition from a first program state to a second program state based on an event caused by executing program code. A state transition may occur based on (e.g., may be caused by, may be associated with, etc.) an event that is caused by executing an executable code segment. For example, a state transition may occur when an operation, in an executable code segment, assigns a new value to a variable.

In some implementations, client device 210 may identify multiple state transitions with regard to a particular object. For example, if an executable code segment causes multiple changes to a variable value, client device 210 may determine state transition information for each of the multiple changes. As another example, if an executable code segment causes changes to multiple, different variables, client device 210 may determine state transition information corresponding to each of the multiple, different variables. As yet another example, the state transition information may identify a point in the program code where a variable was created and/or deleted, may identify one or more points where the variable changed state, may identify all points in the program code where the variable is called and/or modified, or the like.

As further shown in FIG. 5, process 500 may include collecting structured output information identifying the event, the program state and/or the state transition information associated with the executable code segment and/or returning to block 510 for the next executable code segment (block 550). For example, client device 210 may collect structured output information identifying the event, the program state, and/or the state transition information associated with the executable code segment. In some implementations, client device 210 may store the structured output information. Client device 210 may associate the structured output information with the executable code segment. In some implementations, client device 210 may provide structured output information for display, as described in more detail in connection with FIGS. 4A-4D, above.

In some implementations, client device 210 may collect a subset of the structured output information. For example, client device 210 may collect the information identifying the event and the program state without collecting the state transition information. Additionally, or alternatively, client device 210 may collect the information identifying the event, the program state, and the state transition information.

In some implementations, client device 210 may collect specified structured output information. For example, client device 210 may permit a user to provide collection preferences that identify particular structured output information to collect. Based on the preferences, client device 210 may collect the particular structured output information that is identified for collection, and may not collect other structured output information. Additionally, or alternatively, client device 210 may determine which structured output information to collect. For example, client device 210 may collect structured output information based on a quantity of memory available to store the structured output information, based on a processor usage impact of collecting the structured output information, or the like.

In some implementations, client device 210 may selectively collect structured output information based on a quantity of generated structured output information. For example, assume that an executable code segment includes a loop. In such a case, client device 210 may selectively collect structured output information based on a quantity of structured output information generated when executing the loop. For example, client device 210 may collect structured output information for each iteration of the loop, for every other iteration of the loop, for a first iteration and/or a last iteration of the loop, for no iteration of the loop, or the like. In some implementations, client device 210 may receive information identifying a particular efficiency, and may selectively gather structured output information to achieve the particular efficiency (e.g., to collect a threshold amount of structured output information, to spend a particular quantity of processor resources to gather the structured output information, etc.). In this way, client device 210 may selectively collect structured output information with relation to a loop, which may conserve resources of client device 210.

In some implementations, client device 210 may collect structured output information based on a custom rule. A custom rule may cause client device 210 to collect structured output information based on an event, a condition, a program state, and/or a combination of multiple events, conditions, and/or program states. For example, assume that a user wants client device 210 to collect structured output information based on the program code causing a file to be moved from an original location and subsequently attempting to output information to the original location. The user may provide a custom rule that causes client device 210 to collect the structured output information when the program code causes the file to be moved from the original location and subsequently attempts to output information to the original location. For example, based on the custom rule, client device 210 may place emitters at appropriate locations in the program code, may cause one or more emitters to emit structured output information according to the custom rule, or the like.

As another example of a custom rule, assume that a user wants client device 210 to collect structured output information based on the program code generating a particular combination of variable values. The user may provide a custom rule to cause client device 210 to collect the structured output information based on the program code generating the particular combination of variable values. For example, based on the custom rule, client device 210 may place emitters at appropriate locations in the program code, may cause one or more emitters to emit structured output information according to the custom rule, or the like. In this way, client device 210 may use custom rules for collecting structured output information, which may enable client device 210 to collect structured output information for specific combinations of events, program states, and/or conditions.

In some implementations, client device 210 may collect structured output information based on an object to monitor, a type of object to monitor, or the like. For example, client device 210 may monitor a particular file, variable, function, program, line of program code, memory address, network address, or the like, to determine structured output information. In some implementations, client device 210 may monitor a type of file, variable, function, program, line of program code, memory address, network address, or the like. For example, when a user specifies to collect structured output information based on an executable code segment calling an image type of file, client device 210 may collect structured output information when the executable code segment calls the image type of file. In this way, client device 210 may gather structured output information based on monitoring a particular type of file, which may aid in debugging and/or evaluating interactions between program code and the particular type of file.

In some implementations, client device 210 may collect structured output information based on a level of granularity. Executable code segments may be associated with levels of granularity. For example, a program (e.g., a set of program code) may be associated with a first, highest level of granularity. A section of the program (e.g., as determined by client device 210, as defined by a user, etc.) may be associated with a second, lower level of granularity. A block of the program (e.g., a line of program code, a loop in the program code, a conditional statement in the program code, may be associated with a third, still lower level of granularity. Statements (e.g., functions, operations, etc.) may be associated with a fourth, lowest level of granularity. Other levels of granularity are possible and may be implemented, but assume, for the purpose of this example, that four levels of granularity are implemented.

When collecting structured output information for the program, client device 210 may collect and/or provide the structured output information based on a specified level of granularity. For example, if a user specifies the first level of granularity, client device 210 may provide structured output information for the program (e.g., inputs to the program, outputs provided by the program, processor usage associated with executing the program, memory addresses referenced by inputs and/or outputs of the program, etc.). If the user specifies the second level of granularity, client device 210 may provide structured output information for sections of the program (e.g., inputs to the sections, outputs provided by the section, processor usage associated with each of the sections, memory addresses referenced by inputs and/or outputs of the sections, functions called in the sections, etc.). Similarly, if the user specifies the third level or the fourth level of granularity, client device 210 may provide structured output information for the block level of granularity, or for the statement level of granularity, respectively.

In some implementations, client device 210 may provide hierarchy information in the structured output information. The hierarchy information may identify a hierarchical relationship between objects at a character level, at a variable level, at a statement level, at a line level, at a function level, at a script level, at a block level, at a section level, at a program level, at a file level, or the like. In this way, client device 210 may provide structured output information based on a specified level of granularity, which may conserve processor resources otherwise used to provide unwanted structured output information and increase speed of providing the structured output information.

In some implementations, client device 210 may collect structured output information related to a location (e.g., a file, a directory, etc.). For example, assume that a user wants to debug an interaction between a file and a line of program code. In that case, the user may provide information indicating to collect structured output information for the file and the line of program code. In this way, client device 210 may collect structured output information related to a location, which may aid in debugging interactions between the program code and the location. In some implementations, client device 210 may collect structured output information in relation to a particular variable, a particular function, a particular statement, or the like. For example, client device 210 may collect structured output information each time a variable is modified, each time the variable is called, each time a particular function is called, etc.

In some implementations, client device 210 may provide an output of the executable code segment as if client device 210 is not collecting structured output information. For example, a default behavior, when collecting structured output information, may be to suppress outputs of the executable code segment. In some implementations, client device 210 may provide the output based on a user preference, rather than suppressing the output. For example, assume that the executable code segment causes client device 210 to display a string of "hello world." when executed. In such a case, client device 210 may provide the string of "hello world." for display when collecting structured output information for the executable code segment based on a user preference. For example, a user of client device 210 may specify to provide the output or not to provide the output, and client device 210 may provide the output, or may suppress the output, based on the user preference. In this way, client device 210 may selectively provide an output associated with the executable code segment, which may conserve processor resources otherwise used to provide the output and/or may permit the executable code segment to provide outputs while client device 210 determines structured output information.

In some implementations, client device 210 may re-execute an executable code segment. Client device 210 may re-execute the executable code segment by assigning one or more variable values based on values of the variables during execution of the executable code segment, in some implementations. For example, client device 210 may determine a value of a variable in the executable code segment based on a program state associated with the executable code segment, and may restore the program state by associating the value with the variable. In some implementations, client device 210 may determine one or more processes that are executing in association with the executable code segment, and may cause the one or more processes to be executed in order to re-execute the executable code segment. In this way, client device 210 may re-execute an executable code segment, which may permit client device 210 to debug the executable code segment without executing a remainder of program code associated with the executable code segment.

In some implementations, client device 210 may provide a warning to a user before collecting the structured output information. For example, client device 210 may determine that the structured output information satisfies a threshold (e.g., a threshold quantity, a threshold frequency, etc.) and may provide a warning to the user based on the structured output information satisfying the threshold. In some implementations, the user may interact with the warning to cause client device 210 to provide the structured output information for collection, to cause client device 210 to exclude the structured output information from collection, to cause client device 210 to provide a portion of the structured output information for collection and exclude a remainder of the structured output information, or the like. In this way, client device 210 may collect structured output information based on a user interaction with a warning, which may improve versatility and responsiveness of the collection process.

In some implementations, client device 210 may compare structured output information to expected structured output information. For example, an executable code segment may be associated with one or more particular events, a particular program state, particular state transition information, one or more expected input values, one or more expected output values, or the like (i.e., expected structured output information). Client device 210 may obtain the expected structured output information, and may execute the executable code segment to determine actual structured output information (e.g., one or more observed events, an observed program state, observed state transition information, one or more actual input values, one or more actual output values, or the like).

Client device 210 may compare the actual structured output information to the expected structured output information to determine whether the executable code segment executes in a particular fashion (e.g., a desired fashion, an expected fashion, etc.). In some implementations, client device 210 may perform an action based on comparing the actual structured output information to the expected structured output information. For example, client device 210 may notify a user of a difference between the actual structured output information and the expected structured output information, may modify the executable code segment based on the difference, may store information identifying the difference, or the like.

In some implementations, client device 210 may determine structured output information to collect based on a heuristic method. For example, client device 210 may determine structured output information to collect based on a past occurrence, such as a past user interaction with a particular type of structured output information. As another example, the client device 210 may determine structured output information to collect based on a frequency of occurrence of structured output information. That is, the heuristic method may determine that program code provides an output for display at a threshold frequency (e.g., ten times per second, one hundred times per execution of the program code, ten times more frequently than another output, etc.) and may suppress display of the output based on determining that the output is provided for display at the threshold frequency.

As another example, client device 210 may determine to collect structured output information when in an outermost block (e.g., when client device 210 is not in a nested conditional, a "for" loop, etc.). In this way, client device 210 may determine structured output information to provide based on a heuristic method, which may improve relevance of the provided structured output information, and may improve efficiency of collecting the structured output information.

In some implementations, client device 210 may provide structured output information to another device. For example, client device 210 may provide structured output information relating to a particular error, a particular type of error, or the like, to server device 230 for storage in an error data structure. The error data structure may identify errors related to executing program code, and may associate the errors with structured output information relating to the errors. By adding the structured output information to the error data structure, client device 210 may aid in determining causes of the errors, effects of the errors, or the like. In some implementations, client device 210 may determine expected structured output information, and may provide the expected structured output information to the other device (e.g., for storage, to compare to actual structured output information determined by the other device, etc.).

In some implementations, client device 210 may execute an executable code segment that includes a function, and may provide structured output information relating to inputs and/or outputs of the function to server device 230. Server device 230 may associate the function with the structured output information. For example, the structured output information may identify data types of the inputs and/or outputs, values of the inputs and/or outputs, quantities of the inputs and/or outputs, memory addresses associated with the inputs and/or outputs, processor usage to determine the inputs and/or outputs, or the like. By associating the function with the structured output information relating to the inputs and/or outputs, server device 230 may generate a data structure of functions and information relating to inputs and/or outputs of the functions, which may simplify debugging of program code including the functions.

In some implementations, client device 210 may determine information based on the structured output information. For example, client device 210 may determine that a particular variable value is stored at two memory addresses, and may perform an action based on the determination (e.g., may cause the variable value to be stored at only one memory address, may provide a notification to a user of client device 210, etc.). As another example, client device 210 may determine that a first variable is accessed more frequently than a second variable, and may cause the first variable to be stored in memory with a faster read time than memory that stores the second variable (e.g., a value of the first variable may be stored in RAM and a value of the second variable may be stored on a hard disk drive).

In some implementations, client device 210 may determine a relationship between two or more objects based on the structured output information. For example, assume that program code, when executed, generates an output by combining a first input and a second input. Assume further that client device 210 collects structured output information based on executing the program. Assume that the structured output information identifies the first input and the second input, the operation that combines the first input and the second input, and the output that results from combining the first input and the second input. In that case, client device 210 may analyze the structured output information to determine a relationship between the first input, the second input, and the output. Client device 210 may store and/or provide information that describes the relationship. In this way, client device 210 may determine a relationship between program elements of program code, which may assist a user in understanding the program code.

In some implementations, client device 210 may generate a hierarchical stack based on the structured output information. As an example of a hierarchical stack, consider a first function, a second function, and a third function. Assume that the first function, when executed, calls the second function for execution to determine a first input. Assume further that the second function, when executed, calls the third function to determine a second input. The relationship between the functions may be represented as follows: first (second(third)). Here, the first function, the second function, and the third function share a hierarchical relationship. The first function is at a first level of the hierarchical relationship, the second function is at a second, lower level of the hierarchical relationship, and the third function is at a third, lowest level of the hierarchical relationship. Client device 210 may store hierarchy information identifying a hierarchical stack that identifies the levels associated with the first function, the second function, and the third function in a data structure (e.g., a stack data structure, etc.).

The hierarchy information and the structured output information associated with the hierarchy information may be stored in a common data structure (e.g., the same stack), or different data structures (e.g., different stacks). For example, a first stack may store hierarchy information that identifies a hierarchical stack, and a second stack may store structured output information that identifies an executable code segment and/or information related to executing the executable code segment associated with the hierarchy information. Client device 210 may store information, in the first stack and/or the second stack, that identifies a corresponding item in the other stack. For example, client device 210 may store information in the structured output information stack that identifies corresponding hierarchy information stored in the hierarchy information stack. In some implementations, client device 210 may store information, in the first stack and/or the second stack, that identifies an executable code segment associated with the execution information and/or the hierarchy information.

In some implementations, client device 210, or a user of client device 210, may debug program code based on structured output information. For example, client device 210 may implement a debugging program, based on structured output information, to detect an error in the program code. Based on detecting the error, client device 210 may re-execute a portion of the program code that contains the error (e.g., to collect additional and/or different structured output information related to the portion of the program code, to display hierarchy information related to the error, to attempt to determine a cause of the error, etc.). In this way, client device 210 may provide a robust method of detecting and/or addressing bugs in the program code, by facilitating re-execution and analysis of the program code using the structured output information.

In some implementations, client device 210 may incrementally re-execute one or more executable code segments based on the aggregation information. For example, client device 210 may execute a first executable code segment of a portion of program code (e.g., a first operation, line of program code, etc.), and then may pause execution of the portion of program code. A user of client device 210 may evaluate the re-execution, and may cause client device 210 to resume re-execution. Client device 210 may execute a second executable code segment, and then may pause execution of the portion of program code, and so on. In this way, client device 210 may facilitate incremental re-execution of program code, which may permit more thorough analysis of the re-execution and save processing resources.

In some implementations, client device 210 may use the structured output information to detect a run-time error. For example, client device 210 may collect structured output information that describes memory addresses accessed based on the program code, other applications that provide information to and/or receive information from the program code, or the like. Client device 210 may determine information related to the memory locations, the other applications, or the like. Based on the information, client device 210 (or a user of client device 210), may attempt to detect a run-time error. For example, based on the information, client device 210 may attempt to detect a mis-allocation of memory, an incompatible application, or the like. In this way, client device 210 may detect run-time errors based on analyzing structured output information, which may permit client device 210 to correct flaws in the program code that cause the run-time errors.

In some implementations, the structured output information may indicate a relationship between a program state and an executable code segment (e.g., a line of the program code). For example, client device 210 may store structured output information that indicates a relationship between a program state and a portion of a program code. The state may indicate variable values, active processes, hierarchy information, or the like, based on the executable code segment. Client device 210 may provide information describing the state (e.g., for display) after storing the structured output information. For example, a user may interact with the executable code segment (e.g., via a graphic interface), and client device 210 may provide the information describing the state based on receiving the interaction.

In some implementations, client device 210 may return to block 510 of process 500. For example, after collecting structured output information for a first executable code segment, client device 210 may obtain a second executable code segment. Client device 210 may perform the operations described in connection with process 500 with regard to the second executable code segment. In this way, client device 210 may determine structured output information for a set of executable code segments, and may store and/or provide the structured output information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, the client device may collect structured output information related to executing the program code. By collecting the structured output information, the client device may determine the exact state of the program at any given point in the program. The client device may use the structured output information to facilitate debugging, runtime error correction, performance evaluation, and/or re-execution of executable code segments.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   executing an executable code segment of program code,
   the program code related to a plurality of emitters corresponding to a plurality of execution states,
   the executable code segment being associated with an emitter of the plurality of emitters,
   the executable code segment, when executed, causing a particular event, the executable code segment, when executed, being associated with a particular execution state of the plurality of execution states, and the executing being performed by a device;

identifying, based on the emitter and during execution of the executable code segment, the particular event and a program state, associated with the particular event, of a plurality of program states corresponding to the plurality of execution states, the identifying being performed by the device;

storing the program state associated with the particular event, the program state:

corresponding to the particular execution state, and describing the execution of the executable code segment at a point in the executable code segment associated with the particular event, information describing the particular event and the program state being usable to reconstruct the execution of the executable code segment without execution of executable code segments of the program code other than the executable code segment, and the storing being performed by the device; and generating structured output information, the structured output information including information describing the plurality of program states and information describing a plurality of events associated with the plurality of execution states, and the generating being performed by the device.

2. The method of claim 1,
where the method further comprises:
storing the structured output information.

3. The method of claim 1, where the structured output information is actual structured output information; and
where the method further comprises:
receiving expected structured output information,
the expected structured output information identifying one or more expected values associated with executing the program code; and
comparing the actual structured output information to the expected structured output information to determine if one or more actual values identified by the actual structured output information match the one or more expected values.

4. The method of claim 3, further comprising:
performing an action based on comparing the actual structured output information to the expected structured output information.

5. The method of claim 1, further comprising:
inserting the plurality of emitters in the program code.

6. The method of claim 1, further comprising:
determining monitored structured output information that is being monitored by the device; and
selectively inserting the plurality of emitters in the program code to receive the plurality of execution states or information describing events that are included in the monitored structured output information.

7. The method of claim 1, further comprising:
receiving information indicating a particular efficiency for emitting the plurality of execution states; and
selectively inserting the plurality of emitters in the program code to achieve the particular efficiency.

8. A non-transitory computer-readable medium storing instructions, the instructions comprising:
one or more instructions that, when executed by one or more processors, cause the one or more processors to:
execute an executable code segment of program code,
the program code related to a plurality of emitters corresponding to a plurality of execution states,
the executable code segment being associated with an emitter of the plurality of emitters,
the executable code segment, when executed, causing a particular event, and
the executable code segment, when executed, being associated with a particular execution state of the plurality of execution states;
identify, based on the emitter and during execution of the executable code segment, the particular event and a program state, associated with the particular event, of a plurality of program states corresponding to the plurality of execution states;
store the program state associated with the particular event,
the program state:
corresponding to the particular execution state, and
describing the execution of the executable code segment at a point in the executable code segment associated with the particular event, and
information describing the particular event and the program state being usable to reconstruct the execution of the executable code segment without execution of executable code segments of the program code other than the executable code segment; and
generate structured output information,
the structured output information including information describing the plurality of program states and information describing a plurality of events associated with the plurality of execution states.

9. The non-transitory computer-readable medium of claim 8, where the one or more instructions, when executed by the one or more processors, further cause the one or more processors to:
reconstruct the execution of the executable code segment based on the information describing the particular event and the program state and without the execution of the executable code segments of the program code other than the executable code segment.

10. The non-transitory computer-readable medium of claim 8, where the one or more instructions, when executed by the one or more processors, further cause the one or more processors to:
receive information identifying a level of granularity,
the level of granularity indicating that the information describing the particular event and the program state is to be stored at one or more of:
a character level,
a statement level,
a line level,
a function level,
a script level,
a block level,
a section level,
a program level, or
a file level; and
selectively store, or exclude from storing, the information describing the particular event and the program state based on the level of granularity.

11. The non-transitory computer-readable medium of claim 8, where the one or more instructions, when executed by the one or more processors, further cause the one or more processors to:
perform an action based on the information describing the particular event and the program state.

12. The non-transitory computer-readable medium of claim 8, where the one or more instructions, when executed by the one or more processors, further cause the one or more processors to:
   receive an instruction to re-execute the executable code segment without re-executing a particular executable code segment of the program code,
      the particular executable code segment being before the executable code segment in the program code;
   perform one or more operations to restore the program state associated with the executable code segment based on the instruction; and
   re-execute the executable code segment based on the instruction and based on the one or more operations.

13. The non-transitory computer-readable medium of claim 8, where the one or more instructions, when executed by the one or more processors, further cause the one or more processors to:
   receive a custom rule,
      the custom rule indicating at least one of an event, a state, or a condition based on which to store the information describing the particular event and the program state; and
   selectively store, or exclude from storing, the information describing the particular event and the program state based on the custom rule.

14. The non-transitory computer-readable medium of claim 8, where the one or more instructions, when executed by the one or more processors, further cause the one or more processors to:
   selectively store, or exclude from storing, the information describing the particular event and the program state based on at least one of:
      a heuristic method,
      a quantity of the information describing the particular event and the program state, or
      storage preferences.

15. The non-transitory computer-readable medium of claim 8, where the one or more instructions, when executed by the one or more processors, further cause the one or more processors to:
   store the structured output information describing the plurality of events, caused when the program code is executed, and the plurality of program states when the program code is executed.

16. The non-transitory computer-readable medium of claim 15, where the one or more instructions, when executed by the one or more processors, further cause the one or more processors to:
   store state transition information,
      the state transition information describing a difference between a first program state, of the plurality of program states, and a second program state, of the plurality of program states.

17. The non-transitory computer-readable medium of claim 16, where the one or more instructions, when executed by the one or more processors, further cause the one or more processors to:
   store or provide the structured output information,
      the structured output information including the state transition information, the information describing the plurality of events, and the information describing the plurality of program states.

18. A device, comprising:
   one or more processors to:
   execute a plurality of executable code segments of program code,
      the program code related to a plurality of emitters corresponding to a plurality of execution states,
      the executable code segments being associated with the plurality of emitters,
      the program code, when executed, causing a plurality of events, and
      the program code, when executed, being associated with a plurality of execution states;
   identify, based on the plurality of emitters and during execution of the plurality of executable code segments, the plurality of events and a plurality of program states associated with the plurality of events; and
   store the plurality of program states associated with the plurality of events,
      the plurality of program states being captured by the plurality of emitters associated with the plurality of executable code segments,
      each program state, of the plurality of program states, describing a corresponding execution state, of the plurality of execution states, and describing an execution of a corresponding executable code segment, of the plurality of executable code segments, at a point in the corresponding executable code segment associated with a corresponding event, of the plurality of events,
      the plurality of emitters generating structured output information describing the plurality of events and the plurality of program states, and
      the structured output information describing the plurality of events and the plurality of program states being usable to reconstruct the execution of the plurality of executable code segments without execution of executable code segments of the program code other than the plurality of executable code segments.

19. The device of claim 18, where the one or more processors are further to:
   determine a hierarchical relationship between two or more events in the program code; and
   store hierarchy information identifying the hierarchical relationship between the two or more events in the program code.

20. The device of claim 18, where the one or more processors are further to:
   store information that identifies memory addresses associated with objects of the program code;
   determine that a particular object, of the objects of the program code, is associated with two or more of the memory addresses; and
   perform an action based on the particular object being associated with the two or more of the memory addresses.

* * * * *